United States Patent [19]
Staunton et al.

[11] 3,774,978
[45] Nov. 27, 1973

[54] AUXILIARY HYDRAULIC BRAKE LOCK

[75] Inventors: Fredric J. Staunton, Madison Lake; Vincent J. Tillman, St. Peter, both of Minn.

[73] Assignee: Minnesota Automotive, Inc., Mankato, Minn.

[22] Filed: Apr. 24, 1972

[21] Appl. No.: 246,649

[52] U.S. Cl. .................................................. 303/89
[51] Int. Cl. ........................ B60r 25/08, B60t 17/16
[58] Field of Search ....................................... 303/89

[56] References Cited
UNITED STATES PATENTS
3,497,265  2/1970  Vandermark ........................ 303/89
3,597,016  8/1971  Gachot et al. ....................... 303/89

*Primary Examiner*—Lloyd L. King
*Attorney*—Ralph F. Merchant

[57] ABSTRACT

An improved brake locking apparatus for hydraulic brake systems having an accumulator and an accumulator control unit. A pressure control element in the accumulator maintains a fluidic pressure in a closed brake system equal to that of a precharged pressure. A pair of sequentially operated lock valves in the accumulator control unit block fluid flow from the brake cylinders to the master cylinder when the braking system is locked, and sequentially unseat to gradually release the back pressure flow to the master cylinder when the braking system is unlocked. Control valves in the accumulator control unit cooperate with the sequentially operated lock valves to allow fluidic precharging of the accumulator by the master cylinder when the braking system is locked, and isolate the accumulator from the hydraulic braking system when the braking system is unlocked.

10 Claims, 10 Drawing Figures

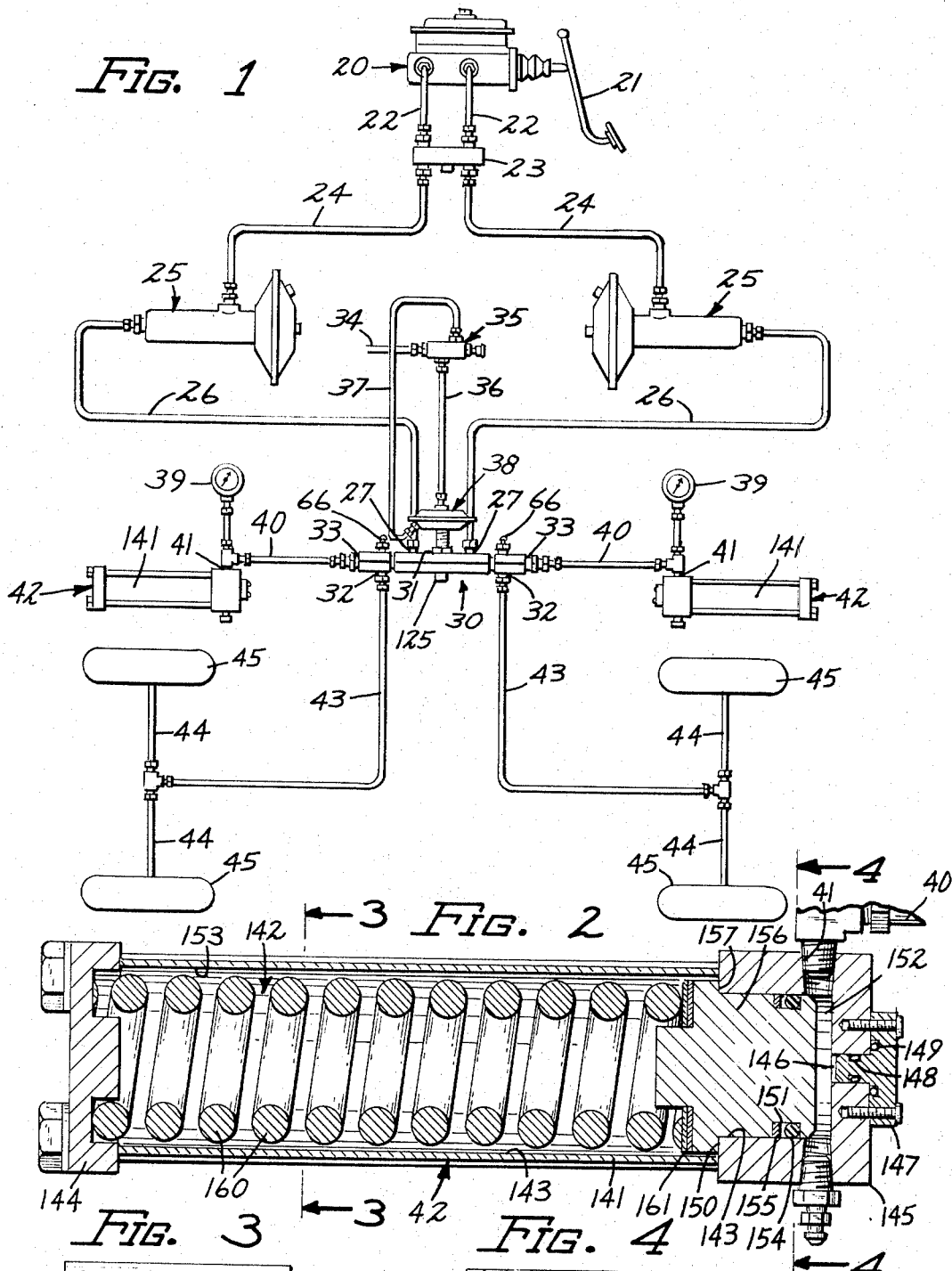
Fig. 1
Fig. 2
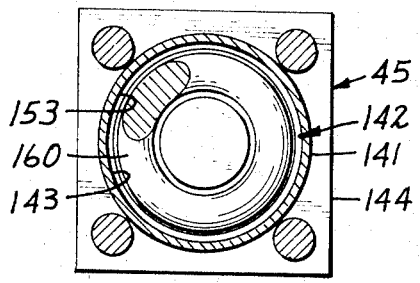
Fig. 3
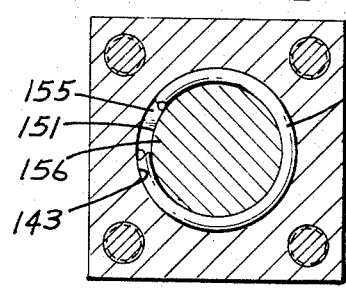
Fig. 4

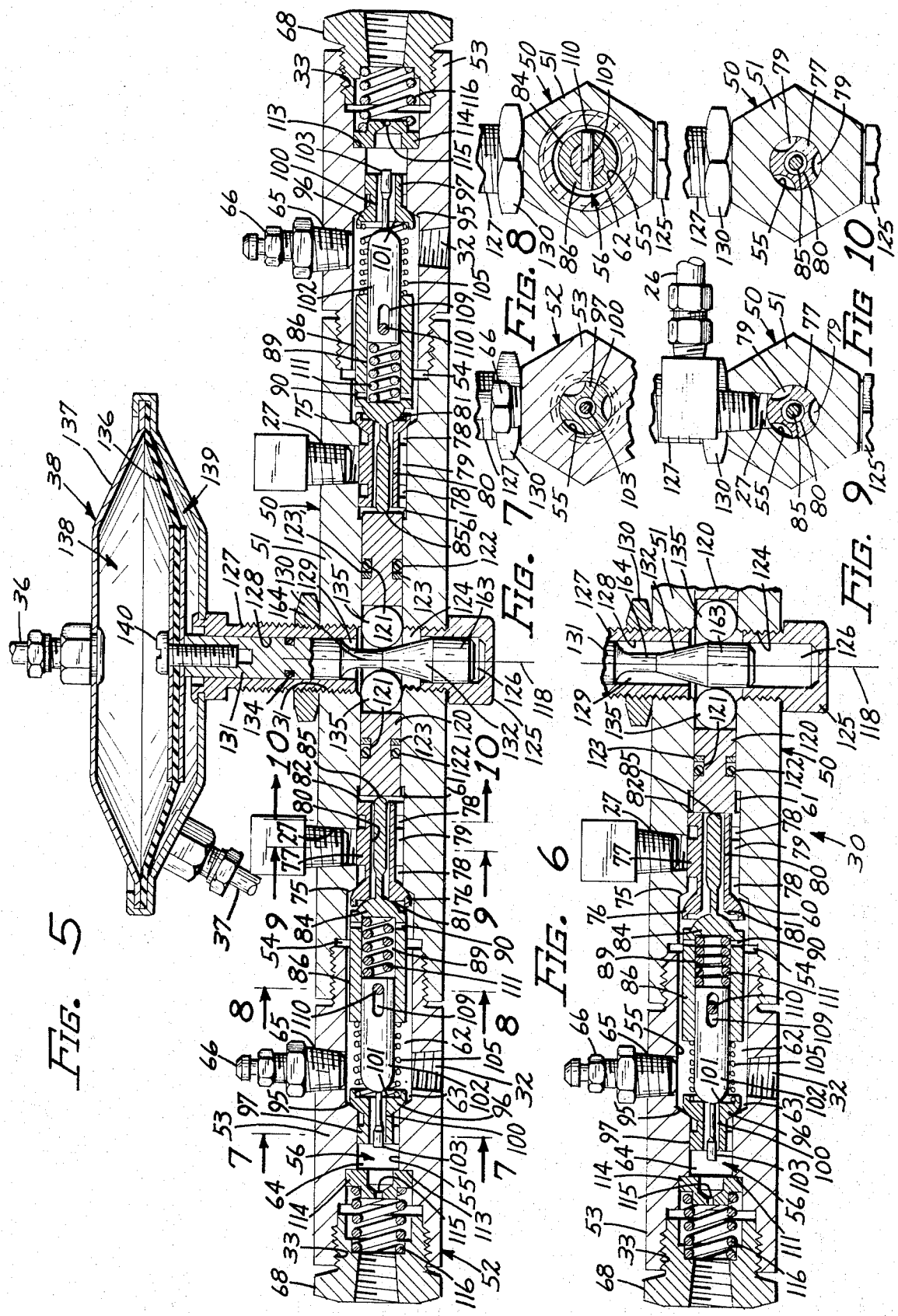

AUXILIARY HYDRAULIC BRAKE LOCK

BACKGROUND OF THE INVENTION

Hydraulic braking systems, when operated under severe braking conditions, experience significant temperature increases in their hydraulic fluid. The hydraulic fluid expands with the increased temperature, causing a proportionate increase in pressure within the closed braking system. As the temperature of the fluid decreases with either nonuse or with less severe use of the braking system, the braking fluid reciprocally contracts, causing a proportionate decrease in system pressure.

The differential temperature/pressure relationship in hydraulic fluids becomes important in the design of a brake locking system that must lock the brakes of a nonmoving vehicle over an extended period of time. For example, fluid temperature in a braking system of a motor vehicle that has been recently subjected to severe braking conditions, will be significantly greater than the ambient air temperature. Thereafter, when the motor vehicle is brought to rest and the brake locking apparatus is engaged, the brakes of the vehicle will initially become locked by applied pressure from the heated brake fluid. However, if the brake locking apparatus does not provide for contraction of the braking fluid as it cools over a period of time, the brake locking pressure will gradually decrease in proportion to the brake fluid temperature decrease until a point is reached where the applied brake locking pressure is ineffective to lock the brakes of the vehicle. It is obvious, that such a failure in a brake locking system can result in costly damage to both the motor vehicle and to its surrounding environment. In large trucks, requiring a large volume of hydraulic fluid for their braking, considerable pressure changes result due to the expansion and contraction of the fluid, and therefore amplify the aforementioned problem.

Prior art hydraulic brake locking systems have attempted to solve the problem by including an accumulator within the hydraulic braking system. An accumulator, in general, functions to absorb increased pressure within a braking system caused by temperature gradients, and reapplies the absorbed pressure to the braking system as required by the changing temperature/pressure gradients. The net effect within the braking system is to provide a uniform pressure to the brake cylinders.

Two accumulator design approaches have evolved for hydraulic brake locking systems. A first approach attempting to solve the underpressure problem previously described, utilizes an accumulator which is designed to be precharged and to thereafter apply required sustaining pressure to the brake cylinders as the brake fluid cools. A second approach relates to an overpressure problem caused by a contraction of the mechanical elements of the braking system as they cool. Accordingly, accumulators designed for the overpressure problem were not prechargeable but were designed to accumulate a charge only after the brakes were locked and the mechanical brake elements started to cool. Recent studies have shown that the underpressure braking problem caused by the fluidic thermal expansion significantly outweighs that caused by the mechanical thermal expansion.

One prior art accumulator typical of the first approach accumulator design, included the accumulator as an integral part of the normal braking system. Accordingly, the accumulator was continuously charged whenever braking pressure was applied from the master cylinder to the brake cylinders. This design resulted in inefficient normal braking due to the back-pressure caused by the accumulator, and resulted in excessive wear to the accumulator due to its continuous operation. Further, since the accumulator was an integral part of the brake locking control mechanism, a defective or worn accumulator could not be simply replaced but required an expensive replacement of the entire accumulator and control mechanism.

Certain prior art has also recognized the need to protect the master cylinder from the sustained high back pressures maintained within the accumulator and individual brake cylinders during a brake locking condition. Accordingly, locking valve arrangements have been employed to isolate the master cylinder from the accumulator and the brake cylinders when the braking system is in a brake locking condition.

The present invention provides a simple and highly efficient brake locking apparatus that provides reliable brake locking pressure to the brakes of a hydraulic brake system susceptible to either over or under pressure conditions caused by severe heating of the brakes during operation. Although the present invention will be described in conjunction with a motor vehicle braking system, it should be understood that the invention is not limited to this use and, can be used on any closed hydraulic braking system.

SUMMARY OF THE INVENTION

In the present invention, the master cylinder and one or more brakes of a closed hydraulic brake system are connected respectively to first and second axially aligned chambers of an accumulator control unit. A third chamber axially aligned and continuous with the first and second chambers is operatively connected to an accumulator. A vacuum actuated primary control unit operates the accumulator control unit in either a locked or an unlocked condition. Normal motor vehicle operation and braking operations are permissible when the accumulator control unit is in an unlocked condition.

When the accumulator control unit is in a locked condition, and when the hydraulic system is uniformly pressurized, a pair of axially aligned lock valves within the accumulator control unit housing seat under the bias pressure of a first spring and fluidically isolate the first and second chambers. An axially aligned control valve element cooperatively engaging one of the lock valves, and capable when seated to inhibit fluid flow between the second and third chambers, is held unseated by the lock valve.

When the system brakes are applied, pressurized fluid flow from the master cylinder creates a positive differential pressure between the first and second chambers causing the locked valves to open against the first spring bias pressure and to allow fluid flow from the master cylinder to the accumulator and brake cylinders. A piston in the accumulator moves in response to the applied fluid pressure and compresses an accumulator spring, thereby accumulating a charge of energy in the spring. Upon release of the fluid pressure applied by the master cylinder a negative pressure differential is created between the first and second chambers, which along with the bias force of the first spring causes the lock valves to close, thereby isolating the master cylinder from the increased pressure within the accumulator and the brake cylinders. The stored energy within accumulator spring thereafter causes the accumulator piston to apply a constant hydraulic pressure to the brake cylinders through the third and second chambers.

When activated to an unlocked brake condition the primary control unit imparts sequential unseating motion to the pair of lock valves against the bias of the first spring causing a gradual pressure release back to the master cylinder and establishing fluid flow between the master cylinder and brake cylinders. The control valve, as cooperatively engaged with the unseating lock valve, is caused to seat against the bias of a second spring, thereby blocking fluid flow between the second and third chambers. The accumulator is therefore removed from the brake system during normal braking operations.

It is one object of the present invention, therefore, to provide an improved hydraulic brake locking apparatus.

It is another object of the present invention to provide an improved brake locking apparatus having an accumulator that is fluidicly isolated from the brake system during normal braking operations.

It is a further object of the present invention to provide an improved hydraulic brake locking apparatus wherein the accumulator is detachable from the accumulator control means.

These and other objects of our invention will become apparent to those skilled in the art upon consideration of the accompanying specification, claims, and drawings.

BRIEF DESCRIPTION OF THE DRAWINGS

Referring to the drawings, wherein like numerals represent like parts throughout the several views:

FIG. 1 is a diagrammatic view of a dual hydraulic brake system for automotive vehicles, incorporating the brake locking apparatus of the present invention;

FIG. 2 is an enlarged axial section view of the accumulator portion of the present invention disclosed in FIG. 1;

FIG. 3 is a transverse section taken on line 3—3 of FIG. 2;

FIG. 4 is a transverse section taken on line 4—4 of FIG. 2;

FIG. 5 is an enlarged axial section view of the dual accumulator control portion of the present invention as disclosed in FIG. 1;

FIG. 6 is a view corresponding to a single side of the dual accumulator control portion disclosed in FIG. 5 with some of the parts shown in different positions;

FIG. 7 is a transverse section taken on the line 7—7 of FIG. 5;

FIG. 8 is a transverse section taken on the line 8—8 of FIG. 5;

FIG. 9 is a transverse section taken on the line 9—9 of FIG. 5; and

FIG. 10 is a transverse section taken on line 10—10 of FIG. 5.

DESCRIPTION OF THE PREFERRED EMBODIMENT

Referring to FIG. 1, there is diagrammatically shown a dual hydraulic brake system incorporating the present invention. For the sake of brevity, and since the dual hydraulic brake system is in principle functionally symmetrical, the following description will be addressed to only one-half of the dual system, with like parts of the other half carrying like numerals. A conventional master cylinder 20, operated by a pedal-equipped brake lever 21, is operatively connected by means of a conduit 22, a brake failure warning switch 23, a conduit 24, a vacuum controlled hydraulic booster 25, and a conduit 26 to an inlet port 27 of a dual accumulator control unit 30. The accumulator control unit 30 further has a primary control inlet 31, an outlet port 32 and an accumulator connection port 33. A primary vacuum conduit 34 is operatively connected by means of a vacuum actuator control unit 35 and a first vacuum conduit 36 and a second vacuum conduit 37 to a vacuum actuator unit 38. Vacuum actuator unit 38 is operatively connected to the primary control inlet 31 of the control unit 30. The accumulator connection port 33 of the control unit 30 is operatively and detachably connected by a conduit means 40 to an accumulator inlet port 41 of an accumulator 42 and is further operatively connected to a pressure control gauge 39. Outlet port 32 of the control unit 30 is connected by means of a main conduit 43 and by a pair of branch conduits 44 to a pair of brake cylinders, not shown, but operatively connected to wheels 45. In the preferred embodiment, one side of the symmetrical control unit 30 operates the front brake cylinders of an automotive vehicle and the other side operates the back brake cylinders.

The dual accumulator control unit 30 is shown in axial section in FIG. 5. A first housing member 50 having a first generally cylindrical wall 51 is threadedly connected to a second housing member 52 having a second generally cylindrical wall 53. Threadedly connected first and second housing walls 51 and 53 respectively and a sealing washer member 54 form a continuous generally cylindrical wall surface 55 of a fluid chamber 56.

The cylindrical wall surface 55 has formed therein a first annular shoulder which defines a first axial passage 60 partitioning the fluid chamber 56 into a first chamber 61 and into a second chamber 62 axially aligned with the first chamber 61. The outlet port 32 is formed by a threaded hole through the second housing 52 and opening into the second chamber 62. A second threaded outlet port 65 through the second housing 52 and opening into the second chamber 62 is sealed by a bleed plug 66 which is removable for bleeding the fluid chamber 56.

The cylindrical wall surface 55 has formed therein a second annular shoulder defining a second axial passage 63 between a third chamber 64 axially aligned and continuous with the second chamber 62. An open end 67 of the third chamber 64 is closed by a detachable end cap member 68 and a sealing washer 69. The accumulator connection port 33 is defined by an axially threaded hole formed through the end cap member 68 and opening into the third chamber 64.

The first axial passage 60 defines a first lock valve seat 75. The first lock valve seat 75 engages a first lock valve element 76 having a valve body 77 that engages the cylindrical wall surface 55 of the first chamber 61 and axially and loosely slides therein. A pair of annular ring openings 78 and a plurality of axial grooves 79 formed within the valve body 77 of the first lock valve element 76 allow unrestricted fluid flow within the first chamber 61 (FIG. 9 and FIG. 10). The first lock valve element 76 has a first axial passageway 80 defining a second lock valve seat 81 and axially extending through the first valve element body 77 and through an end 82 of the first valve element body 77.

The second lock valve seat 81 engages a second lock valve element 84 having an elongated stem 85 axially and loosely movable within the first lock valve axial passageway 80, and extending therethrough such that the stem 85 terminates beyond the adjacent end 82 of the first valve element body 77. Second lock valve element 84 further has an annular stem 86 axially extending within the second chamber 62 and having a cylindrical stem wall defining an interior stem surface which forms a cylindrical stem cavity 89. A plurality of radial openings 90 formed within the cylindrical stem wall of the annular stem 86 allow free fluid flow between the second chamber 62 and the cylindrical stem cavity 89.

The second axial passage 63 defines a secondary control valve seat 95. The secondary control valve seat 95 engages a secondary control valve element 96 having a valve element body 97 that engages the cylindrical wall surface 55 of the third chamber 64 and is formed to loosely and axially slide therein and to allow free fluid flow around the secondary valve element 96 in the third chamber 64. The secondary valve element 96 contains a second axial passageway 100 extending therethrough and forming a principal control valve seat 101.

A first spring element 105 is interposed between the secondary control valve element 96 and the annular stem 86 of the second lock valve element 84 to yieldingly urge engagement of the secondary control valve element 96 with the secondary control valve seat 95; engagement of the second lock valve element 84 with the second lock valve seat 81; and engagement of the first lock valve element 76 with the first lock valve seat 75.

The principal control valve seat 101 engages a principal control valve element 102 having an elongated stem 103 axially movable within the second axial passageway 100 of the secondary control valve element 96. The principal control valve element 102 further has a cylindrical stem portion thereof axially extending within the second chamber 62 and slidedly received within the cavity 89 of the annular stem 86 of the second lock valve element 84. An elongated opening 109 formed within the cylindrical stem of control element 102, extends normally therethrough and slidedly receives a cylindrical pin 110 carried by the annular stem 86. The elongated opening 109 and the cylindrical pin 110 cooperate to restrict the relative axial sliding movement of the cylindrical stem of control element 102 and the annular stem 86.

A second spring element 111, contained within the cylindrical stem cavity 89 of the annular stem 86, is interposed between the second lock valve element 84 and the cylindrical stem of the principal control valve element 102 so as to yieldingly urge the second lock valve element 84 and the principal control valve element 102 in axially opposite directions. Maximum extension of the second spring element 111 is limited by the axial sliding engagement of the cylindrical pin 110 within the elongated opening 109.

A third annular shoulder formed within the second cylindrical housing wall 53 defines a restricting valve seat 113 within the third chamber 64. The restricting valve seat 113 is engaged by a restricting valve element 114 axially movable to and away from the restricting valve seat 113, the valve element 114 having a restrictive axial opening 114 formed therethrough. A third spring element 116 is interposed between a detachable end cap member 68 and the restricting valve element 114 to yieldably urge the restricting valve element 114 to seating engagement with the restricting valve seat 113.

A valve actuating cylindrical piston 120 having an annular opening 121 therein is axially movable within the first chamber 61 so as to engage the end 82 of the first lock valve element body 77 and the stem termination of stem 85. An "O" ring 122 and an annular washer 123 contained within the annular spring opening 121 of the valve actuating piston 120, engage the cylindrical wall surface 55 of the first chamber 61 and forms a fluid seal for the first chamber 61.

The primary control inlet 31 (FIG. 5) of the accumulator control unit 30 comprises a threaded hole extending normally through the first housing cylindrical wall 51 and intersecting the fluid chamber 56. The center line 118 of the primary control inlet 31 defines the symmetrical center line of accumulator control unit 30. A lower hole extension 124 of the primary control inlet 31 in the cylindrical wall 51 is capped by a capping bolt 125 having an axially extending internal cavity 126 formed therein and joining with the primary chamber 56. A tubular stud 127 having an interior cylindrical wall surface 128 defining an axial passageway 129 therethrough is axially secured within the primary control inlet 31 by a nut 130. A generally cylindrical plunger 131 having a conical cam surface 132 is axially movable within the axial passageway 129 of the tubular stud 127 and within the axially extending internal cavity 126 of the capping bolt 125. The conical cam surface 132 is characterized by a high cam surface 163 and by a low cam surface 164. An "O" ring 134, positioned within an annular groove formed in the plunger 131, slidedly and sealingly engages the interior cylindrical wall surface 128 of the tubular stud 127. A cam operated ball 135 axially movable within the fluid chamber 56 simultaneously engages the conical cam surface 132 of the plunger 131 and the valve actuating cylindrical piston 120.

The tubular stud 127 is also connected to the vacuum actuator 38. The vacuum actuator 38 has a vacuum controlled diaphragm 136 movable within a vacuum actuator housing 137 so as to simultaneously expand a first vacuum chamber 138 while contracting a second vacuum chamber 139. The first vacuum conduit 36 opens into the first vacuum chamber 138, and the second vacuum conduit 37 opens into the second vacuum chamber 139. A plunger actuating bolt 140 axially extends through the vacuum controlled diaphragm 136 and is threadedly secured to the plunger 131 so as to cause the plunger 131 to axially move in response to movement of the vacuum controlled diaphragm 136. The vacuum actuator control unit 35, the vacuum actuator unit 38, the plunger 131, the cam operated ball 135 and the valve actuating piston 120 and associated connecting apparatus perform the primary control functions in the operation of the brake locking apparatus.

In the preferred embodiment, the third chamber 64, the accumulator connection port 33, the conduit 40, and the accumulator inlet port 41 form a fluid passage to the accumulator 42.

Referring to FIG. 2, an accumulator housing 141 forms an accumulator chamber 142 and defines an interior wall surface 143 having formed therein an annular stop surface 150. The accumulator chamber 142 is closed by a first end cap member 144 and a second end cap member 145 having bolts or the like extending therebetween. The second end cap member 145 has an axial opening 146 therethrough which, in the preferred embodiment, is sealed by a plug 147, containing an "O" ring 148, and a quad ring 149 bolted to the second end cap member 145. The plug 147 may be removed for the addition of a pressure switch when a signal circuit is desired. A rigid generally cylindrical accumulator piston 156 having an annular groove 151 therein, slidedly engages the interior wall surface 143 of the accumulator housing 141. An "O" ring 154 and an annular backup ring 155 contained within the annular groove 151 slidedly and sealingly engage the internal wall surface 143 and divide the accumulator chamber 142 into a first accumulator piston 152 and a second accumulator chamber 153. The accumulator piston 156 has an annular shoulder 157 formed therein which engages the annular stop surface 150 to determine a minimum volume for the first accumulator chamber 152. An axially expandable and compressible spring element 160, and one or a plurality of shim washers 161 are interposed between the first end cap member 144 and the accumulator piston 156 to yieldingly urge the accumulator piston 156 in a direction tending to cause the piston shoulder 157 to engage with the annular stopping surface 150.

Although coil springs are employed throughout the preferred embodiment, it will be understood that any functional yielding means may be used without departing from the spirit or intent of this invention. Further, although a cylindrical pin and elongated hole are employed as the engagement and restricting means between the second lock valve element and the principal control valve element, it will be understood that any other engagement means that will perform the desired function may be used. Further, it will be understood that the present invention is not limited to an axially in-line system, nor is its application limited to use in a braking system of a motor vehicle.

OPERATION OF THE PREFERRED EMBODIMENT

The brake locking apparatus is operable in a locked condition or in an unlocked condition. The brake locking apparatus is generally operated in an unlocked condition during normal motor vehicle and braking operation and in a locked condition when the vehicle is at rest.

The vacuum actuator control unit 35 (FIG. 1) is manually controlled and is operable from a locking position to an unlocked position. When in a locked state, the vacuum actuator control unit 35, applies a vacuum from the primary vacuum conduit 34 to the second vacuum conduit 37 while simultaneously blocking the first vacuum conduit 36. The vacuum applied through the second vacuum conduit to the vacuum actuator 38 creates a positive differential pressure between the first vacuum chamber 138 and the second vacuum chamber 139 causing the vacuum controlled diaphragm 136 to move in a direction so as to minimize the volume of the second vacuum chamber 139 and to maximize the volume of the first vacuum chamber 138 (FIG. 5). Therefore, in the locked condition, the plunger actuating bolt 140 will cause the plunger 131 to be axially positioned within the tubular stud 127 such that the cam controlled ball 135 is resting against the low cam surface 164 of the conical cam surface 132 of the plunger 131. The valve actuating piston 120 is thereby axially positioned relative to the first lock valve element 76 and the second lock valve element 84 as illustrated in FIG. 5. The second lock valve element 84 is seated against the second lock valve seat 81 by axial force applied by the first spring element 105 against the annular stem 86 of the second lock valve element 84. The axial force applied by the first spring element 105 further causes the first lock valve element 76 to seat against the first lock valve seat 75.

When the first and second lock valve elements 76 and 84 respectively are seated, the second spring element 111 is maximally extended as limited by the cylindrical pin 110 within the elongated opening 109 of the principal control valve element 102. Since the cylindrical pin 110 is rigidly secured to the annular stem 86 of the second lock valve element 84, the principal control valve element 102 is held in an unseated position by the first spring element 105.

In the locked position, therefore, fluid flow is enabled between the second and third chambers 62 and 64 respectively through the second axial passageway 100 in the secondary control valve element 96. Accordingly, fluid flow is freely enabled between the brake cylinders 45 and the accumulator 42. However, fluid flow is blocked between the second chamber 62 and the first chamber 61 by the seated first and second lock valve elements 76 and 84, respectively. When the brake lever 21 of the master cylinder 20 is depressed, a fluid (charging) pressure from the master cylinder 20 is amplified by the hydraulic booster 25 and applied through the inlet port 27 to the first chamber 61 causing the first and second lock valve elements 76 and 84, respectively, to unseat against the bias force of the first spring element 105. The axial unseating movement of the first and second lock valve elements 76 and 84, respectively, is insufficient to cause the principal control valve element 102 to seat against the principal control valve seat 101; therefore, the pressurized fluid flow passes from the master cylinder 20 to the accumulator 42 and to the brake cylinders 45.

The charging fluid applied from the master cylinder 20 flows through the second axial passageway 100 of the secondary control valve element 96, causing the restricting valve element 114 to unseat against the bias of the third spring element 116, allowing the charging fluid to flow through the accumulator connection port 33 and the accumulator inlet port 41 to the first accumulator chamber 152. The charging fluid within the first accumulator chamber 152, when applied against the accumulator piston 156 with sufficient force to overcome the bias of the accumulator spring element 160, causes the accumulator piston 156 to axially move and to contract the accumulator spring element 160, thereby precharging the accumulator. The accumulator spring element 160 will thereafter continuously exert a bias pressure against the accumulator piston 156 equal to the precharge pressure until the accumulator piston 156 has axially returned to its uncharged position, occurring when the annular shoulder 157 of the accumulator piston 156 engages the annular stop surface 150 of the interior wall surface 143. The shim washer 161 allows for adjustment of the initial bias of the accumulator spring element 160 due to variances in the spring constant and physical length.

When the precharging pressure from the master cylinder 20 is relaxed, a negative differential pressure will occur between the first and second chambers 61 and 62, respectively, thereby causing the first and second lock valve elements 76 and 84, respectively, to reseat, isolating the master cylinder 20 from the precharged accumulator 42 and from the pressurized brake cylinders of wheels 45. The restricting valve element 114 will simultaneously seat against the restricting valve seat 113 as urged by the third spring element 116. As the brake cylinders (45) and the fluid contained within the braking system cools, the accumulator piston will axially move in the direction urged by the precharged accumulator spring element 160 to compensate for any decrease in brake fluid volume, thereby providing a constant brake locking pressure to the brake cylinders (45). Should further heating of the brake cylinders occur, causing an expansion in the brake fluid, che accumulator piston 156 will compensate for the increased pressure by axially moving against the bias of the accumulator spring element 160, thereby accumulating the increased energy within the accumulator 42.

When the vacuum actuator control unit 35 is energized in an unlocked position, it applies a vacuum from primary vacuum conduit 34 to the first vacuum conduit 36 and blocks the second vacuum conduit 37. A negative pressure differential is thereby produced between the first vacuum chamber 138 and the second vacuum chamber 139 of the vacuum actuator 38, causing the vacuum controlled diaphragm 136 and the plunger actuating bolt 140 to move in a direction causing the second vacuum chamber 139 to expand and the first vacuum chamber 138 to contract. The plunger 131 responds to the movement of the plunger actuating bolt 140, and axially moves within the tubular stud 127 so as to cause the high cam surface 163 of the conical cam surface 132 to impart an axial force to the cam operated ball 135. The cam operated ball 135 axially moves into the first chamber 61, pushing the valve actuating piston 120 ahead of it. The valve actuating piston 120 sequentially engages the stem termination of the second lock valve element elongated stem 85 and thereafter the first valve element end 82 causing the second and first lock valve elements 84 and 76, respectively, to sequentially unseat against the bias of the first spring element 105 (FIG. 6). Free fluid flow will thereby be momentarily established between the master cylinder 20 and the accumulator 42 and brake cylinders of wheels 45. The sequential unseating of the second and first lock valve elements 84 and 76, respectively, provides a gradual pressure release back to the master cylinder 20. The accumulator 42 is simultaneously serially discharged through the restrictive axial opening 115 of the restricting valve element 114; through the second axial passageway 100 as restricted by the elongated stem 103; and finally through the second and first chambers 62 and 61, respectively, to the master cylinder 20.

In continuing its axial unseating movement in response to the axial movement of the valve actuating piston 120, the second lock valve element 84 and the second spring element 111 urge the principal control valve element 102 toward seating engagement with the principal control valve seat 101. As seating engagement between the principal control element 102 and the principal control valve seat 101 is accomplished, the cylindrical pin 110 axially moves within the elongated opening 109 in the direction thereof urged by the valve actuating piston 120, while the second spring element 111 compresses and maintains a seating force on the principal control valve element 102. In the fully unlocked position, the relative positioning of the locking valve apparatus parts is as shown in FIG. 6. Fluid flow to the accumulator 42 is completely blocked by the seating engagement of the principal and secondary control valve elements 102 and 96, respectively. Fluid flow, however, is freely allowed between the brake cylinders of wheels 45 and the master cylinder 20.

It is to be understood that while we have shown a specific embodiment of our invention, that this is for the purpose of illustration only and that our invention is to be limited solely by the scope of the appended claims.

We claim:

1. An improved hydraulic brake locking apparatus comprising:
  a. housing means forming a fluid chamber and having inlet and outlet ports to the fluid chamber, said inlet port adapted to be connected to the master cylinder of a hydraulic brake system, and said outlet port adapted to be connected to one or more brake cylinders of the brake system;
  b. locking valve means within said fluid chamber operable in a locked position to block fluid flow through said inlet port, and operable in an unlocked position to allow fluid flow through said inlet port;
  c. primary control means connected to said housing means and operable to move between first and second positions; said primary control means being operatively connected with said locking valve means such that said primary control means when in its first position, allows said locking valve means to operate in its locked position, and said primary control means when in its second position, causes said locking valve means to operate in its unlocked position;
  d. accumulator means having inlet means and operable to store and to thereafter release the energy of a fluid charge in response to a fluid pressure received by said inlet means;
  e. accumulator passage means connecting said accumulator inlet means with said housing means for establishing fluid communication between said accumulator means and said fluid chamber; and
  f. control valve means connected to control fluid flow through said accumulator passage means in response to said primary control means; said control valve means operable to directionally block fluid flow from the fluid chamber to the accumulator means when said primary control means is in its second position, and operable to allow fluid flow through said accumulator passage means when said primary control means is in its first position.

2. An improved hydraulic brake locking apparatus according to claim 1, wherein said fluid chamber has a generally cylindrical interior characterized by first axial passage means partitioning said interior into first and second axially aligned chambers in fluid communication with each other, and wherein said inlet port opens into said first chamber, said outlet port opens into said second chamber, and said accumulator passage means is fluidly continuous with said second chamber; and wherein said locking valve means comprises:
   a. a first lock valve seat defined by said first axial passage means;
   b. a first lock valve element axially movable in said first axial passage means toward and away from seating engagement with said first lock valve seat, said first lock valve element having an axial passageway therethrough and defining a second lock valve seat; said first lock valve element operable in an unseated condition when said locking valve means is in said unlocked position, and operable in a seated condition when said locking valve means is in said locked position;
   c. a second lock valve element axially movable toward and away from seating engagement with said second lock valve seat; said second lock valve element being operable in an unseated condition when said locking valve means is in said unlocked position, and operable in a seated condition when said locking valve means is in said locked position; and
   d. first yielding means connected to urge said second and said first lock valve elements toward seating engagement respectively with said second and said first lock valve seats.

3. An improved hydraulic brake locking apparatus according to claim 2, wherein said accumulator passage means includes a third chamber axially aligned with said second chamber and fluidly connected therewith by a second axial passage means, and conduit means connecting said third chamber with said accumulator means for fluid communication therebetween; and wherein said control valve means includes:
   a. a principal control valve seat defined by said second axial passage means;
   b. a principal control valve element axially movable in said second axial passage means toward and away from seating engagement with said principal control valve seat;
   c. second yielding means connected to yieldingly urge said principal control valve element toward seating engagement with said principal control valve seat; and
   d. means connected to cause said principal control valve element to unseat in response to movement of the primary control means to its first position.

4. An improved hydraulic brake locking apparatus according to claim 3, wherein said control valve means is further characterized by:
   a. a secondary control valve seat defined by said second axial passage means; and
   b. a secondary control valve element axially movable within said second axial passage means toward and away from seating engagement with said secondary control valve seat; said secondary control valve element having an axial passageway therethrough and defining said principal control valve seat; said secondary control valve element being urged toward seating engagement with said secondary control valve seat by said first yielding means, and operable to unseat against the bias of said first yielding means in response to positive differential fluid pressure between said third and second chambers respectively.

5. An improved hydraulic brake locking apparatus according to claim 3, wherein said primary control means when moving to its second position causes said second and said first lock valve elements to respectively sequentially unseat against the bias of said first yielding means; and wherein said means connected to cause said principal control valve element to unseat comprises:
   a. first stem means axially extending from said second lock valve element into said second chamber for axial movement with said second lock valve element;
   b. second stem means axially extending from said principal control valve element into said second chamber for axial movement with said principal control valve element; and
   c. guiding stop means within said second chamber cooperatively engaging said first and second stem means, and operable to impart unseating motion to said principal control valve element when said second and said first lock valve elements are positioned in their respective locked positions.

6. An improved hydraulic brake locking apparatus according to claim 5, wherein said first stem means axially extending from said second lock valve element comprises an annular stem having a cylindrical stem wall whose interior surface defines a cylindrical stem cavity; wherein said second stem means axially extending from said principal control valve element comprises a cylindrical stem that axially extends within said cylindrical stem cavity and slidingly engages said cylindrical stem wall of said annular stem; and wherein said second yielding means is contained within said cylindrical stem cavity and operatively engages said cylindrical stem of said principal control valve element and said second lock valve elements so as to yieldingly urge them in axially opposite directions as limited by said guiding stop means.

7. An improved hydraulic brake locking apparatus according to claim 6, wherein said guiding stop means comprises:
   a. elongated opening means normally extending and formed within the cylindrical stem of said principal control valve element; and
   b. extension means normally projecting from said cylindrical stem wall within said cylindrical stem cavity; said projecting extension means slidedly engaging said elongated opening means so as to limit, against the bias of said second yielding means, the maximum relative motion of said cylindrical and annular stems in axially opposing directions.

8. An improved hydraulic brake locking apparatus according to claim 1, wherein said accumulator means is further defined by:
   a. an accumulator housing forming an accumulator chamber having an interior wall surface and an accumulator inlet port to said accumulator chamber, said accumulator inlet port adapted to be detachably connected to said accumulator passage means;
   b. a pressure control element having sliding engagement with said interior wall surface and dividing said accumulator chamber into a first accumulator chamber and a second accumulator chamber, said pressure control element being movable in opposite directions to simultaneously expand one of said chambers while contracting the other;

c. accumulator yielding means connected to urge said pressure control element in a direction tending to contract said first accumulator chamber and to expand said second accumulator chamber; and d. stop element means forming a portion of the interior wall surface and limiting movement of said pressure control element in the direction thereof urged by said accumulator yielding means and defining a minimum volume of said first accumulator chamber.

9. An improved hydraulic brake locking apparatus according to claim 8, wherein the interior wall surface of said accumulator wall chamber is generally cylindrical, wherein said pressure control element comprises a rigid generally cylindrical piston having axial sliding engagement with said interior wall surface so as to fluidically separate said first and second accumulator chambers, and wherein said accumulator yielding means comprises an axially expandable and compressible spring.

10. An improved hydraulic brake locking apparatus according to claim 1, wherein a pair of said accumulator means, said accumulator passage means, said control valve means, said locking valve means, and said housing means are operatively connected to a single primary control means to form a dual hydraulic brake locking apparatus, and wherein said primary control means includes symmetrical cam means movable between said first and second positions, said cam means being operatively connected with said pair of locking valve means so as to allow each of said pair of locking valve means to simultaneously operate in said locked position when the cam means are in said first position and operable to cause each of said pair of locking valve means to simultaneously operate in said unlocked position when the cam means are in said second position.

* * * * *